United States Patent
Beema et al.

(10) Patent No.: US 9,930,641 B2
(45) Date of Patent: Mar. 27, 2018

(54) AUTOMATED AND ADAPTIVE CHANNEL SELECTION ALGORITHM BASED ON LEAST NOISE AND LEAST DENSITY OF WIRELESS SENSORS NETWORK IN NEIGHBORHOOD

(71) Applicant: Honeywell International Inc., Morristown, NJ (US)

(72) Inventors: Vishnu Vardhan Reddy Beema, Bangalore (IN); Sandeep Suresh, Bangalore (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 223 days.

(21) Appl. No.: 14/794,935

(22) Filed: Jul. 9, 2015

(65) Prior Publication Data

US 2017/0013597 A1    Jan. 12, 2017

(51) Int. Cl.
*H04W 72/04* (2009.01)
*G08B 25/00* (2006.01)
*G08B 25/10* (2006.01)
*H04W 76/02* (2009.01)
*G08B 25/14* (2006.01)
*H04W 84/18* (2009.01)

(52) U.S. Cl.
CPC .......... *H04W 72/04* (2013.01); *G08B 25/003* (2013.01); *G08B 25/10* (2013.01); *H04W 76/02* (2013.01); *G08B 25/14* (2013.01); *H04W 84/18* (2013.01)

(58) Field of Classification Search
None
See application file for complete search history.

(56) References Cited

U.S. PATENT DOCUMENTS

| 2007/0038743 | A1  | 2/2007  | Hellhake et al. |
| 2007/0211681 | A1* | 9/2007  | Sun .......................... H04L 45/04 370/338 |
| 2008/0291855 | A1* | 11/2008 | Bata ...................... H04W 84/18 370/311 |
| 2009/0017864 | A1* | 1/2009  | Keevill ............... H04L 12/5692 455/552.1 |
| 2011/0007727 | A1* | 1/2011  | Driesen ............. H04W 72/0406 370/338 |

(Continued)

OTHER PUBLICATIONS

Extended European search report for corresponding EP patent application 16176070.7, dated Oct. 20, 2016.

*Primary Examiner* — Xavier Szewai Wong
(74) *Attorney, Agent, or Firm* — Husch Blackwell LLP

(57) ABSTRACT

An apparatus and method are provided that include a control panel of an automation system that protects a secured geographic area actively scanning each of a plurality of radio frequency channels of a predetermined radio frequency spectrum for other access points operating under an IEEE 802.15.4 format, the control panel identifying at least two of the plurality of channels with a lowest relative number of the other access points operating under the IEEE 802.15.4 format, the control panel performing an energy scan on each of the identified at least two channels, the control panel selecting one of the at least two channels with a lowest relative energy and the control panel setting up a wireless connection with each of a plurality of wireless sensors within the secured area on the selected channel under the IEEE 802.15.4 format.

16 Claims, 2 Drawing Sheets

(56) References Cited

U.S. PATENT DOCUMENTS

| | | | |
|---|---|---|---|
| 2013/0328697 A1* | 12/2013 | Lundy | G08C 17/02 340/870.16 |
| 2015/0003404 A1* | 1/2015 | Gokturk | H04W 16/10 370/330 |
| 2015/0097689 A1 | 4/2015 | Logue et al. | |
| 2017/0027003 A1* | 1/2017 | Kojima | H04W 28/065 |
| 2017/0105221 A1* | 4/2017 | Ahluwalia | H04W 72/0486 |

* cited by examiner

AUTOMATED AND ADAPTIVE CHANNEL SELECTION ALGORITHM BASED ON LEAST NOISE AND LEAST DENSITY OF WIRELESS SENSORS NETWORK IN NEIGHBORHOOD

FIELD

This application relates to security systems and more particularly, to interference between wireless security systems.

BACKGROUND

Systems are known to protect people and assets within secured areas. Such systems are typically based upon the use of one or more wireless sensors that detect threats within a secured area.

Threats to people and assets may originate from any of a number of different sources. For example, a fire may kill or injure occupants who have become trapped by a fire in a home. Similarly, carbon monoxide from a fire may kill people in their sleep.

Alternatively, an unauthorized intruder, such as a burglar, may present a threat to assets within the area. Intruders have also been known to injure or kill people living within the area.

In the case of intruders, sensors may be placed in different areas based upon the respective uses of those areas. For example, if people are present during some portions of a normal day and not at other times, then sensors may be placed along a periphery of a space to provide protection while the space is occupied while additional sensors may be placed within an interior of the space and used when the space is not occupied.

In most cases, threat sensors are connected to a local control panel. In the event of a threat detected via one of the sensors, the control panel may sound a local audible alarm. The control panel may also send a signal to a central monitoring station.

While conventional security systems using wireless sensors work well, they are sometimes difficult to set up. Accordingly, a need exists for better methods and apparatuses for setting up such systems.

DETAILED DESCRIPTION

Figure 1:
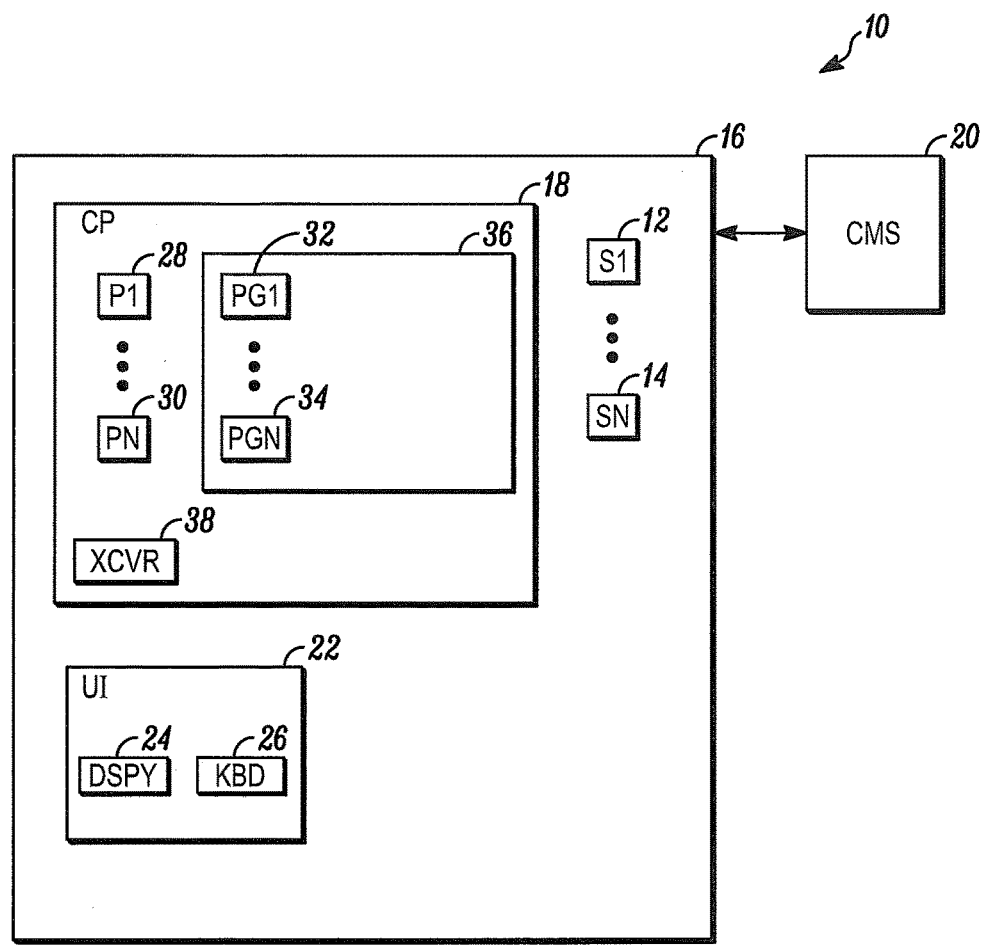
FIG. 1 is a block diagram of an automation system in accordance with disclosed embodiments.
Figure 2:
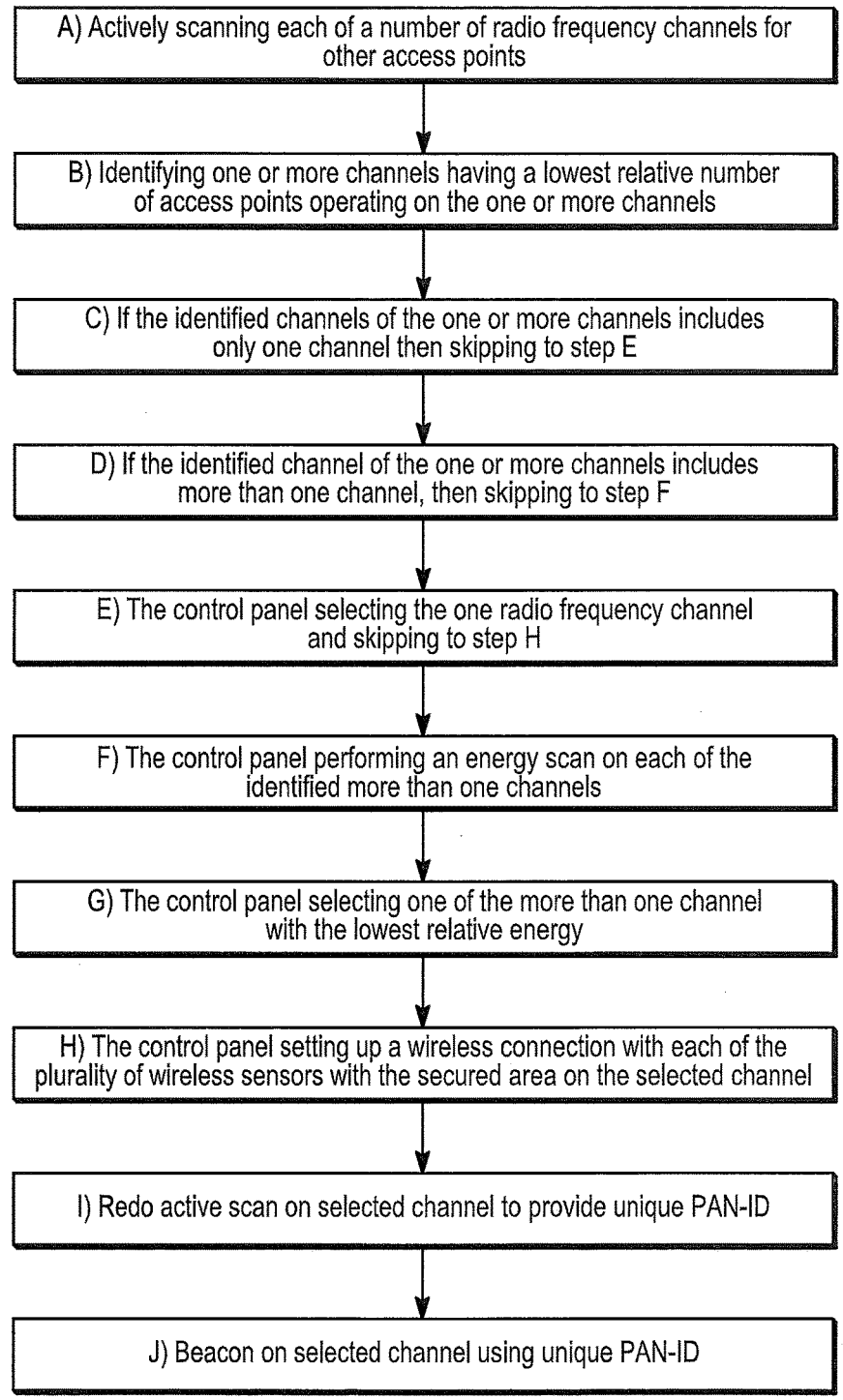
FIG. 2 is a flow diagram of a method in accordance with disclosed embodiments.

While disclosed embodiments can take many different forms, specific embodiments thereof are shown in the drawings and will be described herein in detail with the understanding that the present disclosure is to be considered as an exemplification of the principles thereof as well as the best mode of practicing the same and is not intended to limit the application or claims to the specific embodiment illustrated.

FIG. 1 depicts an automation system (e.g., a security system) 10 shown generally in accordance with an illustrated embodiment. Included within the security system may be a number of sensors 12, 14 used for detecting threats within a secured geographic area 16 of the system. Threats may originate from any of a number of different sources. For example, an intruder may represent a threat to people and/or assets within a home or business. Similarly, a fire or a gas leak may threaten the safety of those same people and/or assets.

Accordingly, the sensors may be embodied in any of a number of different forms. For example, at least some of the sensors may be switches placed on doors and windows providing entry into and egress from the secured area. Other sensors may be passive infrared (PIR) sensors placed within the secured area in order to detect intruders who have been able to circumvent the sensors along a periphery of the secured area. Still other sensors may be smoke and/or fire detectors.

Also associated with the secured area is a control panel or controller 18. The control panel may be located within the secured area as shown in FIG. 1 or located remotely.

The control panel may monitor the sensors for activation. Upon activation of one of the sensors, the control panel may compose an alarm message and send it to a central monitoring station 20. The central monitoring station may respond by summoning the appropriate help (e.g., police, fire department, etc.).

The security system may be controlled by a human user through a user interface 22. Included within the user interface may be a display 24 and a keyboard 26.

Located within the control panel, the user interface and each of the sensors may be one or more processor apparatuses (processors) 28, 30, each operating under control of one or more computer programs 32, 34 loaded from a non-transitory computer readable medium (memory) 36. As used herein, reference to a step performed by a computer program is also reference to the processor that executed that step.

The security system may be armed and disarmed through the user interface. In this regard, an authorized user may enter a personal identification number (PIN) and an instruction through the keyboard. The instruction may be an arm instruction, an arm away command, and/or a disarm command.

A status processor may monitor the user interface for input from the human user. Upon detecting the PIN, the status processor may compare the entered PIN with the PINs of authorized users. If the entered PIN matches the PIN of the authorized user, then the status processor executes the instruction. If not, then the input may be ignored, or an error message is generated.

In an armed state, an alarm processor monitors each of the sensors for activation. Upon detecting activation of one of the sensors, the alarm processor composes and sends the alarm message to the central monitoring station. The alarm message may include an identifier of the system (e.g., account number, street address, etc.), an identifier of the sensor activated, and the time of activation.

In general, the sensors of FIG. 1 are wireless devices that each communicate with the control panel on one or more radio frequency (RF) channels. Accordingly, a respective radio frequency transceiver 38 located within the control panel and each of the sensors is provided in support of such wireless communication.

For example, the control panel may include one or more communication processors that define an RF super frame for communication between the control panel and sensors. The super frame, in turn, may be defined by a number of time division multiple access (TDMA) slots that re-occur over a predetermined time period. Some of the slots may be reserved for use by the sensors under a 6LowPan/IPv6/IoT protocol.

The super frame may include a slot reserved for a beacon and slots reserved for the exchange of messages between the sensors and the control panel under an IEEE 802.15.4 and/or 6LowPAN protocol. The beacon may identify a starting point of the super frame and incorporate a number of data fields that each define respective aspects of the super frame.

Each sensor of the system of FIG. 1 may have a short address, an IPv6 (6LowPan) address, and a MAC identifier (MAC ID). This addressing system facilitates accessing of the sensors by any other IPv6 compatible device as described in various Internet of Things (IoT) publications. This allows the sensors to be arranged by respective processors into star or tree networks.

A status of the control panel (e.g., armed, disarmed, trouble, etc.) may be carried as part of a beacon payload. If necessary, a detailed indicator of panel status may also be carried within respective slots under the 6LowPAN/802.15.4 protocols. Control slots of the beacon may also be used to send request messages from the control panel to end devices (e.g., sensors, etc.) based upon IEEE 802.15.4 addresses of the end devices.

Under one illustrated embodiment, a channel frequency used as a main operating channel by the system for exchanging information between the control panel and sensors via the super frame is automatically selected by a channel selection system operating from within the control panel. The channel selection system selects an RF channel based upon a number of specific steps. First, a detection processor of the channel selection system actively scans a predetermined spectrum (e.g., set of contiguous channels) for access points of other automation systems operating on one or more of those scanned channels. Active scanning, in this situation, means receiving and decoding personal area network identifiers (PAN-IDs) from other access points on each scanned channel in order to determine the number of access points operating on each scanned channel.

Based upon the number of access points identified by the active scan, the channel selection system may proceed by a number of different methods. For example, the detection processor may first identify the scanned channels with the smallest relative number of access points operating on that channel. If there is only one channel that meets this criteria, then the detection processor or a related selection processor selects this channel. On the other hand, if there is more than one channel that meets this criteria (i.e., two or more channels with zero access points or two or more channels with the same number of access points), then the detection processor or the related selection processor performs an energy scan on these channels. In this case, the energy scan identifies the channel with the least energy and least number of nearby access points operating on this channel. In this case, the channel with the least energy is selected by the detection processor or the related selection processor.

Once a channel frequency has been selected, the detection processor or a set up processor may perform another active scan of the selected channel. In this case, the second active scan is to identify the PAN-IDs of any other access points operating on this channel. This is part of a process used by the system to select its own unique PAN-ID. In this case, the unique PAN-ID of the system may be selected randomly based upon the identified PAN-IDs.

Once the channel frequency and PAN-ID have been selected, a beacon processor may begin transmitting a beacon for the benefit of nearby wireless sensors within the secured area. The sensors detect the beacon and automatically register either directly with the control panel or through other sensors in a parent-child relationship.

In general, the system of FIG. 1 solves a number of problems not addressed by prior systems. For example, under IEEE 802.15.4 standards, channel selection of a coordinator/master is based on the channel with the least noise. This suffers from the issue that in a noisy environment (noise generated by other technologies using 2.4 GHz, such as WiFi or ZigBee, etc.), the master will pick non-overlapping channels under the standards of channel 11 and channel 25 only. With other high power beacon-enabled automation networks on the same channel (11 or 25) in a noisy environment of closely located apartments/households, this will result in one beacon interfering with the other and overlapping of slots among systems resulting in missed alarms/messages.

Under the IEEE802.15.4 standards, an energy scan is to be performed on all channels. Based upon the least energy, the channel is selected. Once a channel is selected, an active scan is performed to select the unique PAN-ID.

WiFi channels coexist with IEEE802.15.4 devices. Because of the high energy of WiFi devices, most IEEE802.15.4 based access points will select non-WiFi interference channels.

In a beacon enabled system with a number of IEEE802.15.4 access points operating on the same radio frequency channel, there will be many collisions and a great deal of interference among beacons. Because of this situation, it is difficult to enroll devices and difficult later to maintain synchronism between enrolled devices and the beacon.

The system of FIG. 1 solves many of these problems. The processes (algorithms) of the system of FIG. 1 are executed completely automatically. There is no need for any user intervention or entering of any specific parameters.

The system provides the least or zero interference. There is a uniform spreading of access points and sensors across channels 11-25, resulting in the least/zero interference among sensors on the same channels. There can be up to 15 neighbors without an overlapping channel, which is more than sufficient for a practical installation/deployment scenario.

There are zero messages missed. Because of the non-overlapping of channels and no interference between neighboring systems, there is no missing of alarms or any other critical messages.

There is a lower enrollment time. Because of the least/zero interference, retries by sensors are avoided, resulting in faster enrollment and, hence, reduced enrollment time.

There is automatic detection and avoidance of WiFi channels. The system automatically detects the existence of WiFi traffic in a specific channel and avoids those channels for use by the system.

The system provides the best compromise between noisy and densely used channels. It also improves battery life. Because of reduced interference from other systems in the same channel, the sensors are able to transmit alarms on the first attempt and, in most cases, eliminate retries.

The sequence of steps that are followed by the system can be summarized as follows so that there are minimal access points per channel. First, the system performs an active scan on all channels. By doing so, the system knows the number of access points/PAN-IDs already present on each of the channels. If there is a channel with zero or with less access points than the other channels, then the system selects that channel. If there is more than one channel with zero access points or with the same number of access points, then the system performs an energy scan on those channels. This will help in selecting a channel with the least energy and the least number of access points. Finally, the system performs a second active scan on the selected channel. This is done to select the unique PAN-ID apart from neighboring PAN-IDs. Once the PAN-ID is selected, the system starts beaconing on the selected channel.

In general, the system includes a control panel of an automation system that protects a secured geographic area actively scanning each of a plurality of radio frequency channels of a predetermined radio frequency spectrum for other access points operating under an IEEE802.15.4 format, the control panel identifying at least two of the plurality of channels with a lowest relative number of the other access points operating under the IEEE802.15.4 format, the control panel performing an energy scan on each of the identified at least two channels, the control panel selecting one of the at least two channels with a lowest relative energy, and the control panel setting up a wireless connection with each of a plurality of wireless sensors within the secured area on the selected channel under the IEEE802.15.4 format.

Alternatively, the system includes an automation system that protects a secured geographic area, a processor of the automation system that actively scans each of a plurality of radio frequency channels of a predetermined radio frequency spectrum for other nearby access points operating under an IEEE802.15.4 format, a processor of the automation system that identifies at least two of the plurality of channels with a lowest relative number of the other nearby access points operating under the IEEE802.15.4 format, a processor of the automation system that performs an energy scan on each of the identified at least two channels, and a processor of the automation system that selects one of the at least two channels with a lowest relative energy.

Alternatively, the system includes a) a control panel of an automation system that protects a secured geographic area actively scanning each of a plurality of radio frequency channels of a predetermined radio frequency spectrum for other access points operating under an IEEE802.15.4 format, b) the control panel identifying one or more of the actively scanned radio frequency channels having a lowest relative number of access points operating on the one or more channels, c) if the identified channels of the one or more channels includes only one channel, then skipping to step e, d) if the identified channels of the one or more channels includes more than one channel, then skipping to step f, e) the control panel selecting the one radio frequency channel and skipping to step h, f) the control panel performing an energy scan on each of the identified more than one channels, g) the control panel selecting one of the more than one channels with a lowest relative energy, and h) the control panel setting up a wireless connection with each of a plurality of wireless sensors within the secured area on the selected channel under the IEEE802.15.4 format.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown or sequential order to achieve desirable results. Other steps may be provided, steps may be eliminated from the described flows, and other components may be added to or removed from the described embodiments.

The invention claimed is:

1. A method comprising:
a control panel of a first automation system that protects a secured area actively scanning each of a plurality of radio frequency channels of a predetermined radio frequency spectrum for access points of other automation systems operating under a standard wireless format;
the control panel receiving and decoding personal network identifiers for the access points;
the control panel determining a respective first number of the access points operating on each of the plurality of radio frequency channels based on the personal network identifiers;
the control panel identifying which of the plurality of radio frequency channels on which the respective first number of the access points operating is smallest;
the control panel selecting one of the plurality of radio frequency channels based on the respective first number of the access points operating thereon and a lowest relative energy of the plurality of radio frequency channels received from a respective energy scan on each of the plurality of radio frequency channels on which the respective first number of the access points operating is smallest and performed when a second number of the plurality of radio frequency channels on which the respective first number of the access points operating is smallest is greater than one; and
the control panel setting up a respective wireless connection with each of a plurality of wireless sensors within the secured area on the one of the plurality of radio frequency channels selected under the standard wireless format.

2. The method as in claim 1 wherein setting up the respective wireless connection with each of the plurality of wireless sensors includes defining a super frame on the one of the plurality of radio frequency channels selected.

3. The method as in claim 2 further comprising the control panel transmitting a beacon that defines the super frame.

4. The method as in claim 1 wherein setting up the respective wireless connection with each of the plurality of wireless sensors includes establishing a mesh network between the control panel and the plurality of wireless sensors.

5. The method as in claim 1 wherein the first automation system includes as a security system.

6. The method as in claim 1 further comprising at least some of the plurality of wireless sensors detecting threats within the secured area.

7. The method as in claim 6 further comprising a processor of the control panel reporting the threats detected to a central monitoring station.

8. An apparatus comprising:
a first automation system that protects a secured area; and
a processor of the first automation system that actively scans each of a plurality of radio frequency channels of a predetermined radio frequency spectrum for access points of other automation systems operating under a standard wireless format,
wherein the processor of the first automation system receives and decodes personal network identifiers for the access points and determines a respective first number of the access points operating on each of the plurality of radio frequency channels based on the personal network identifiers,
wherein the processor of the first automation system identifies which of the plurality of radio frequency channels on which the respective first number of the access points operating is smallest, and wherein the processor of the first automation system selects one of the plurality of radio frequency channels based on the respective first number of the access points operating thereon and a lowest relative energy of the plurality of radio frequency channels received from a respective energy scan on each of the plurality of radio frequency channels on which the respective first number of the access points operating is smallest and performed when a second number of the plurality of radio frequency channels on which the respective first number of the access points operating is smallest is greater than one.

9. The apparatus as in claim 8 further comprising a plurality of sensors that detect threats within the secured area.

10. The apparatus as in claim 9 wherein the processor of the first automation system sets up a respective wireless connection with each of the plurality of sensors within the secured area on the one of the plurality of radio frequency channels selected under the standard wireless format.

11. The apparatus as in claim 10 wherein the processor of the first automation system establishes a mesh network between a control panel and the plurality of sensors.

12. The apparatus as in claim 11 wherein the first automation system includes a security system.

13. A method comprising:
a) a control panel of a first automation system that protects a secured area actively scanning each of a plurality of radio frequency channels of a predetermined radio frequency spectrum for access points of other automation systems operating under a standard wireless format;
b) the control panel identifying one or more channels of the plurality of radio frequency channels having a lowest relative number of the access points operating on the one or more channels by receiving and decoding personal network identifiers for the access points;
c) when the one or more channels includes only one of the plurality of radio frequency channels, skipping to step e;
d) when the one or more channels includes more than one of the plurality of radio frequency channels, skipping to step f;
e) the control panel selecting the one or more channels as a setup channel and skipping to step h;
f) the control panel performing a respective energy scan on each of the one or more channels;
g) the control panel selecting as the setup channel one of the one or more channels with a lowest relative energy as determined by the respective energy scan performed on each of the one or more channels; and
h) the control panel setting up a respective wireless connection with each of a plurality of wireless sensors within the secured area on the setup channel under the standard wireless format.

14. The method as in claim 13 wherein the first automation system includes a security system.

15. The method as in claim 13 wherein setting up the respective wireless connection with each of the plurality of wireless sensors includes setting up a mesh network.

16. The method as in claim 13 further comprising the control panel performing a second active scan on the setup channel to determine a unique personal area network identifier for the control panel.

* * * * *